United States Patent
Daniel et al.

(10) Patent No.: US 10,986,895 B2
(45) Date of Patent: Apr. 27, 2021

(54) COMPRESSIBLE SOLE FOR COMPRESSIBLE FOOTWEAR AND METHOD OF MANUFACTURING COMPRESSIBLE FOOTWEAR

(71) Applicant: Nir Daniel, Tel Aviv (IL)

(72) Inventors: Nir Daniel, Tel Aviv (IL); Galia Daniel, Tel Aviv (IL)

(73) Assignee: Nir Daniel, Tel Aviv (IL)

( * ) Notice: Subject to any disclaimer, the term of this patent is extended or adjusted under 35 U.S.C. 154(b) by 0 days.

(21) Appl. No.: 16/921,175

(22) Filed: Jul. 6, 2020

(65) Prior Publication Data

US 2020/0329813 A1  Oct. 22, 2020

Related U.S. Application Data

(63) Continuation-in-part of application No. PCT/IB2019/051721, filed on Mar. 4, 2019.

(60) Provisional application No. 62/638,167, filed on Mar. 4, 2018.

(51) Int. Cl.
| | |
|---|---|
| *A43B 13/20* | (2006.01) |
| *A43D 86/00* | (2006.01) |
| *B29D 35/00* | (2010.01) |
| *B29D 35/12* | (2010.01) |

(52) U.S. Cl.
CPC .............. *A43B 13/20* (2013.01); *A43D 86/00* (2013.01); *B29D 35/0009* (2013.01); *B29D 35/122* (2013.01)

(58) Field of Classification Search
None
See application file for complete search history.

(56) References Cited

U.S. PATENT DOCUMENTS

| | | | |
|---|---|---|---|
| 4,446,633 A | 5/1984 | Scheinhaus et al. | |
| 4,485,568 A | 12/1984 | Landi et al. | |
| 4,507,879 A | 4/1985 | Dassler | |
| 4,593,482 A | 6/1986 | Mayer | |
| 4,727,662 A * | 3/1988 | Ilon ..................... | A43B 5/0419 |
| | | | 36/117.4 |
| 4,936,028 A * | 6/1990 | Posacki ................. | A43B 13/36 |
| | | | 36/15 |

(Continued)

FOREIGN PATENT DOCUMENTS

| | | |
|---|---|---|
| BR | 102019000782 | 8/2019 |
| CN | 201139113 Y | 10/2008 |

(Continued)

OTHER PUBLICATIONS

Inventor Spotlight: Oluwaseyi Sosanya and his 3d Weaver Loom published by Radhika Seth on Jul. 4, 2014 https://www.solidsmack.com/3d-cad-technology/inventor-spotlight-oluwaseyi-sosanya-3d-weaver-loom/.

*Primary Examiner* — Jila M Mohandesi
(74) *Attorney, Agent, or Firm* — Mark David Torche; Patwrite Law

(57) ABSTRACT

A compressible footwear that may include a compressible sole and a compressible upper part that is mechanically coupled to the compressible sole. The compressible sole consisting essentially of multiple compressible cells that are made of a flexible material and have top openings and bottom openings. The multiple compressible cells span over at least a majority of the compressible sole and are configured to undergo a compression while substantially maintaining a thickness of the compressible sole.

11 Claims, 15 Drawing Sheets

(56) References Cited

U.S. PATENT DOCUMENTS

| | | | |
|---|---|---|---|
| 6,117,518 A * | 9/2000 | Cawse | B29C 70/088 |
| | | | 428/116 |
| 6,138,385 A | 10/2000 | Jungkind et al. | |
| 6,883,254 B2 | 4/2005 | Miller et al. | |
| 7,032,328 B2 | 4/2006 | Wilson et al. | |
| 7,540,100 B2 * | 6/2009 | Pawlus | A43B 13/141 |
| | | | 36/102 |
| 7,565,755 B2 * | 7/2009 | Tvoua | A43B 3/108 |
| | | | 36/11.5 |
| 8,011,119 B2 | 9/2011 | Tvoua et al. | |
| 8,776,400 B2 * | 7/2014 | James | A43B 13/181 |
| | | | 36/102 |
| 10,631,592 B2 * | 4/2020 | Lee-Sang | A43B 9/14 |
| 10,645,990 B2 * | 5/2020 | Rushbrook | A43B 3/26 |
| 2005/0060913 A1 | 3/2005 | Chil et al. | |
| 2006/0156576 A1 | 7/2006 | Sloan | |
| 2007/0051015 A1 | 3/2007 | Haft | |
| 2007/0220777 A1 | 9/2007 | Richardson | |
| 2010/0095554 A1 | 4/2010 | Gillespie | |
| 2011/0094125 A1 | 4/2011 | Weightman | |
| 2014/0373396 A1 | 12/2014 | Chang | |
| 2015/0230548 A1 | 8/2015 | Cross | |
| 2015/0230584 A1 * | 8/2015 | Erickson | A45D 40/00 |
| | | | 132/200 |
| 2017/0119092 A1 | 5/2017 | Lee-Sang | |
| 2017/0182723 A1 | 6/2017 | Calisch et al. | |
| 2020/0046062 A1 | 2/2020 | Perillo et al. | |

FOREIGN PATENT DOCUMENTS

| | | | |
|---|---|---|---|
| CN | 102488351 | 6/2012 | |
| CN | 203969360 U | 12/2014 | |
| CN | 207236239 U | 4/2018 | |
| CN | 210143932 U | 3/2020 | |
| JP | 2012217827 | 11/2012 | |
| KR | 101626730 | 6/2016 | |
| WO | WO0207553 | 1/2002 | |
| WO | WO-2006046241 A2 * | 5/2006 | A43B 3/108 |
| WO | WO2013005344 | 1/2013 | |

* cited by examiner

COMPRESSIBLE SOLE FOR COMPRESSIBLE FOOTWEAR AND METHOD OF MANUFACTURING COMPRESSIBLE FOOTWEAR

CROSS-REFERENCE TO RELATED APPLICATIONS

This application is a continuation-in-part of PCT/IB2019/051721 filed 4 Mar. 2019, which claims priority from U.S. 62/638,167 filed 4 Mar. 2018, the contents of PCT/M2019/051721 and U.S. 62/638,167 are incorporated herein by this reference in their entirety.

TECHNICAL FIELD

The present invention pertains to the art of articles of manufacture, footwear and components thereof. More particularly the present invention relates to a compressible sole for compressible footwear, compressible footwear incorporating such a compressible sole and method of manufacturing the compressible footwear, specifically the compressible sole is compressible into a compressed configuration to assume a compact size, configured for portability of the compressible footwear

BACKGROUND

Footwear such as shoes, slippers, flip-flops, and sandals include a sole and may also include additional elements such as but not limited to an upper part of the footwear.

U.S. Pat. Nos. 7,032,328, 6,883,254, 6,138,385, 4,593,482, 4,507,879, 4,485,568, 4,446,633, 7,032,328, 8,011,119, US2017/119092, US2017/182723, US2015/230548, US2014/373396, US2011/094125, US2010/095554, US2007/051015, US2007/220777, US2006/156576, US2005/060913, US2020/046062, JP2012217827, CN210143932U, CN203969360U, CN207236239U, CN102488351, CN201139113Y, KR101626730, BR102019000782, WO2002/007553, WO2013/005344, WO2018/092023 and "Inventor Spotlight: Oluwaseyi Sosanya and his 3d Weaver Loom", published by Radhika Seth on 4 Jul. 2014 (https://www.solidsmack.com/3d-cad-technology/inventor-spotlight-oluwaseyi-sosanya-3d-weaver-loom/), illustrate various prior art shoes and/or soles.

U.S. Pat. No. 7,376,999 illustrates the need to store a slipper in a confined space and teaches of a slipper having shape memory. The slipper can be rolled up.

US2017/182723, particularly FIGS. 3A, 3B, 11A, 11B, 29A and 29B, may prima facie appear as the closest prior art. US2017/182723 teaches method of forming a structural honeycomb includes cutting and folding a substrate sheet according to predetermined cutting and folding patterns and fold angles that cause the sheet to form a honeycomb having cells that each have at least one face abutting, or nearly abutting, the face of another cell. The honeycomb according to US2017/182723 is then stabilized by joining abutting, or nearly abutting, faces to hold the honeycomb together. The honeycomb in US2017/182723 may have a prespecified three-dimensional shape. The folding pattern according to US2017/182723 may include corrugation, canted corrugation, or zig-zag folds. Joining may employ fixed and/or reversible joinery, including slotted cross section, tabbed strip, angled strip, integral skin, sewn, or laced. At least some folds in US2017/182723 may be partially-closed to create bends and twists in the honeycomb structure. Some surfaces of the honeycomb according to US2017/182723 may be covered with a skin or face sheet. The substrate sheet in US2017/182723 may have flexible electronic traces.

Ofer Tvoua et al. in U.S. Pat. No. 8,011,119 disclose a personally adjustable footwear with at least one sole layer including: a toe portion, a heel portion, and an intermediate portion. The intermediate portion in U.S. Pat. No. 8,011,119 has openings passing vertically through the layer so that the intermediate portion is elastically flexible to allow relative longitudinal displacement of the toe portion and the heel portion to vary a length of the layer without significant variation in a thickness of the layer. A retention mechanism in U.S. Pat. No. 8,011,119 selectively fixes the toe and heel portions in any of a number of relative positions.

BRIEF SUMMARY

There may be provided a method of manufacturing a compressible footwear including: providing a mold defining a lumen for plurality of compressible cells consisting essentially of sidewalls that form top openings and bottom openings; injecting a melted resin of a pliant material into the lumen within the mold; cooling down the mold, thereby curing a compressible sole a plurality of compressible cells; in which the plurality of the compressible cells span over at least a majority of the compressible sole and are configured to undergo a compression while substantially maintaining a thickness of the compressible sole; compressing the plurality of the compressible cells into a compressed configuration; releasing the plurality of the compressible cells into an uncompressed configuration; in which the conferring effectively collapsing along at least one axis selected from the group consisting of: a longitudinal axis across a horizontal plane of the compressible sole and a lateral axis, across the horizontal plane of the compressible sole; in which the collapsing maintaining essentially constant height of the compressible sole along a vertical plane; in which the compressing maintaining an essentially planar shape of the compressible sole along a vertical axis perpendicular to the horizontal plane of the compressible sole; the method does not includes stabilizing the plurality of the compressible cells and maintained compressibility of the plurality of the compressible cells, thereby preserving ability of the plurality of the compressible cells assuming the compressed configuration and the uncompressed configuration.

In some embodiments the method further includes mechanically coupling a foldable upper part that is to the compressible sole; in which the compressible upper part is foldable, configured to sustain the reversibly assuming the compressed configuration and uncompressed configuration by the plurality of the compressible cells while collapsing across a horizontal plane of the compressible sole and substantially maintaining the thickness of the compressible sole and maintaining along a vertical plane and maintaining a planar shape of the compressible sole along.

In some embodiments the plurality of the compressible cells comprise sidewalls forming a grid.

The compressible footwear and sole according to the present invention are compressible into a compressed configuration, to assume a compact size, configured for portability of the compressible footwear.

In some embodiments the plurality of the compressible cells are arranged in slices, in which each slice has a first end and a second end that is wider than the first end, in which the first ends of the slices are adjacent to each other.

In some embodiments the plurality of the compressible cells are arranged in slices in which each slice exhibits a radial symmetry in relation to a point of contact of the narrow ends of the slices.

In some embodiments the plurality of the compressible cells form a compressible approximation of a spiral configured to undergo a rotational compression while substantially maintaining the thickness of the compressible sole.

In some embodiments the method further includes shaping the mold to define a lumen for at least one structural element, configured for holding the compressible sole of the compressible footwear in the uncompressed configuration.

In some embodiments the method further includes shaping the mold to define a lumen for at least one holding element, configured for holding the compressible sole of the compressible footwear in the compressed configuration.

In some embodiments the method further includes selecting the resin, to spontaneously drive the compressible sole of the compressible footwear into the uncompressed configuration, by intrinsic bias of the pliant material.

There may be provided a compressible footwear including: a plurality of compressible cells made of a pliant material and consisting essentially of sidewalls that form top openings and bottom openings; in which the plurality of the compressible cells span over at least a majority of the compressible sole and are configured to undergo a compression while substantially maintaining a thickness of the compressible sole; in which the plurality of the compressible cells are configured for reversibly assuming a compressed configuration and uncompressed configuration;

in which the compression effectively collapsing along at least one axis selected from the group consisting of: a longitudinal axis across a horizontal plane of the compressible sole and a lateral axis, across the horizontal plane of the compressible sole; in which the compression maintaining essentially constant height of the compressible sole along a vertical plane; in which the compression maintaining an essentially planar shape of the compressible sole along a vertical axis perpendicular to the horizontal plane of the compressible sole; in which the plurality of the compressible cells are not stabilized and compressibility of the plurality of the compressible cells is maintained, thereby preserving ability of the plurality of the compressible cells assuming the compressed and uncompressed configurations, and a compressible upper part that is mechanically couplable to the compressible sole; in which the compressible upper part is foldable, configured to sustain the reversibly assuming the compressed configuration and uncompressed configuration by the plurality of the compressible cells while collapsing across a horizontal plane of the compressible sole and substantially maintaining the thickness of the compressible sole and maintaining along a vertical plane and maintaining a planar shape of the compressible sole along.

In some embodiments the plurality of the compressible cells comprise sidewalls that are substantially vertical to the longitudinal axis of the compressible sole.

In some embodiments the plurality of the compressible cells are arranged in slices, in which each slice has a first end and a second end that is wider than the first end, in which the first ends of the slices are adjacent to each other.

There may be provided a compressible sole for a compressible footwear includes: a plurality of compressible cells made of a pliant material and consisting essentially of sidewalls that form top openings and bottom openings; in which the plurality of the compressible cells span over at least a majority of the compressible sole and are configured to undergo a compression while substantially maintaining a thickness of the compressible sole; in which the plurality of the compressible cells are configured for reversibly assuming a compressed configuration and uncompressed configuration; in which the compression effectively collapsing along at least one axis selected from the group consisting of: a longitudinal axis across a horizontal plane of the compressible sole and a lateral axis, across the horizontal plane of the compressible sole; in which the compression maintaining essentially constant height of the compressible sole along a vertical plane; in which the compression maintaining an essentially planar shape of the compressible sole along a vertical axis perpendicular to the horizontal plane of the compressible sole; in which the plurality of the compressible cells are not stabilized and compressibility of the plurality of the compressible cells is maintained, thereby preserving ability of the plurality of the compressible cells assuming the compressed configuration and the uncompressed configuration.

In some embodiments the resin is selected to spontaneously drive the compressible sole of the compressible footwear into the uncompressed configuration, by intrinsic bias of the pliant material.

Definitions

The term structured as referred to herein is to be construed as including any geometrical shape, exceeding in complexity a plain linear shape or a shape embodying simple cylindrical, elliptical or polygonal contour or profile. A more complex shape, a plain linear shape or a shape embodying simple cylindrical, elliptical or polygonal contour or profile, constitutes an example of structured geometry.

The terms firm rigid, or stiff, as referred to herein, are to be construed as having rigidity modulus value, otherwise referred to as the shear modulus, of 4800 MPa or more. Materials are considered to be firm rigid, or stiff but not tensile, when such materials are incapable of being efficiently elastically flexed or bent. Stiff materials, such as steel, are defined as having rigidity modulus value well exceeding 4800 MPa.

The terms pliable or pliant, as referred to herein, are to be construed as having high tensile strength and capable of being efficiently elastically flexed or bent but not being resilient and incapable of being efficiently stretched or expanded. The term tensile or tensile strength, as referred to herein, is to be construed inter alia as a shortcut of the known term ultimate tensile strength, frequently represented acronym as UTS, meaning an intensive property of a material or structure to withstand loads tending to elongate, namely to resist tension, defined as the maximum stress that a material can withstand while been stretched or pulled before sustaining breaking, substantial deformation and/or necking before fracture, such as nylon, relating to essentially non-ductile materials, having UTS value ranging between about 600 and 1000 MPa or more, but not including rigid, firm or stiff materials.

The terms elastic or resilient, as referred to herein, are to be construed as having tensile strength lower than aforesaid tensile strength of pliable or pliant material and optionally being capable of efficiently stretching or expanding, relating inter alia to essentially ductile materials, having UTS value lesser than about 600 MPa.

BRIEF DESCRIPTION OF THE DRAWINGS

There may be provided a compressible footwear that may include a compressible sole and compressible upper part that may be mechanically coupled to the compressible sole; in which the compressible sole consisting essentially of multiple compressible cells that may be made of a pliant material and may have top openings and bottom openings; in which the multiple compressible cells span over at least a majority of the compressible sole and may be configured to undergo a compression while substantially maintaining a thickness of the compressible sole. The compressible sole consisting essentially of multiple compressible cells in the sense that any additional part of the compressible sole should not substantially prevent the compression of the sole. The thickness may be referred to as the height of the compressible sole.

Some parts of the compressible sole may be of different thickness than others. For example—the rear part may be thicker than the front part. In this case each part substantially maintains its thickness under compression. This may apply to any reference to the phrase "undergo a compression while substantially maintaining a thickness of the compressible sole".

Figure 1A:
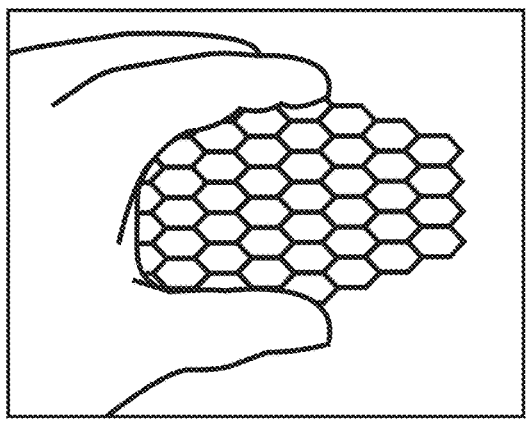

The multiple compressible cells may have sidewalls that may be substantially vertical to the longitudinal axis of the compressible sole.

The multiple compressible cells may have sidewalls that form a grid.

The multiple compressible cells may be arranged in slices that may be oriented to each other.

Each slice may have a first end and a second end that may be wider than the first end, in which the first ends of the slices may be adjacent to each other.

Each slice may be delimited by a supporting rib, in which supporting ribs of different slices exhibit a radial symmetry in relation to a point of contact of the narrow ends of the slices.

Some of the multiple compressible cells form a compressible spiral.

Some of the multiple compressible cells form an compressible approximation of a spiral.

The multiple compressible cells may be configured to undergo a non-linear compression while substantially maintaining the thickness of the compressible sole.

The multiple compressible cells may be configured to undergo a rotational compression while substantially maintaining the thickness of the compressible sole.

The multiple compressible cells may be configured to undergo a linear compression along a longitudinal axis of the compressible sole.

The multiple compressible cells may be configured to undergo a linear compression along a transverse axis of the compressible sole.

The multiple compressible cells may be configured to undergo a linear compression along an axis that may be oriented to the longitudinal axis of the compressible sole.

The multiple compressible cells consisting essentially of sidewalls.

The compressible footwear may include at least one holding element for holding the compressible footwear in a compressed state.

There may be provided a compressible sole of a footwear, in which the compressible sole consisting essentially of multiple compressible cells that may be made of a flexible material and consisting essentially of sidewalls that form top openings and bottom openings; in which the multiple compressible cells span over at least a majority of the compressible sole and may be configured to undergo a compression while substantially maintaining a thickness of the compressible sole.

The multiple compressible cells may have sidewalls that may be substantially vertical to the longitudinal axis of the compressible sole.

The multiple compressible cells may have sidewalls that form a grid.

The multiple compressible cells may be are arranged in slices that may be oriented to each other.

Each slice may have a first end and a second end that may be wider than the first end, in which the first ends of the slices may be adjacent to each other.

Each slice may be delimited by a supporting rib, in which supporting ribs of different slices exhibit a radial symmetry in relation to a point of contact of the narrow ends of the slices.

Some of the multiple compressible cells form a compressible spiral.

Some of the multiple compressible cells form an compressible approximation of a spiral.

The multiple compressible cells may be configured to undergo a non-linear compression while substantially maintaining the thickness of the compressible sole.

The multiple compressible cells may be configured to undergo a rotational compression while substantially maintaining the thickness of the compressible sole.

The multiple compressible cells may be configured to undergo a linear compression along a longitudinal axis of the compressible sole.

The multiple compressible cells may be configured to undergo a linear compression along a transverse axis of the compressible sole.

The multiple compressible cells may be configured to undergo a linear compression along an axis that may be oriented to the longitudinal axis of the compressible sole.

The compressible footwear may include at least one holding element for holding the compressible footwear in a compressed state.

There may be provided a compressible sole of a footwear, in which the compressible sole may include multiple compressible cells that may be made of a flexible material and consisting essentially of sidewalls that form top openings and bottom openings; in which the multiple compressible cells may be configured to undergo a non-linear compression while substantially maintaining a thickness of the compressible sole.

The non-linear compresses may be a rotational compression about an axis of rotation.

The axis of rotation may be located at a side of the compressible sole.

The axis of rotation may be located at an exterior of the compressible sole.

The axis of rotation may be located at rear portion of the compressible sole.

The compressible sole may include at least one holding element for holding the compressible footwear in a compressed state.

There may be provided a compressible sole of a footwear, in which the compressible sole consisting essentially of multiple compressible cells that may be made of a flexible material and consisting essentially of sidewalls that form top openings and bottom openings; in which the compressible sole may be configured to perform, under pressure applied on the compressible sole, a rotational movement to enter a compressed state, while substantially maintaining a thickness of the compressible sole, in which the rotational movement may be executed around an axis of rotation may be substantially normal to the compressible sole.

The axis of rotation may be located at a side of the compressible sole.

The axis of rotation may be located at an exterior of the compressible sole.

The axis of rotation may be located at rear portion of the compressible sole.

The compressible sole may include at least one holding element for holding the compressible footwear in a compressed state.

There may be provided a compressible sole of a footwear, in which the compressible sole consisting essentially of multiple compressible cells that may be made of a flexible material and consisting essentially of sidewalls that form top openings and bottom openings; in which the compressible sole may be configured to perform, under pressure applied on the compressible sole, a folding movement to exit an uncompressed state and enter a compressed state, while substantially maintaining a thickness of the compressible sole, in which a longitudinal axis of the compressible sole while in the uncompressed state may be oriented to a longitudinal axis of the compressible sole while in the compressed state.

The longitudinal axis of the compressible sole while in the uncompressed state may be substantially vertical to the longitudinal axis of the compressible sole while in the compressed state.

The multiple compressible cells may be arranged in slices that may be oriented to each other.

Each slice may have a first end and a second end that may be wider than the first end, in which the first ends of the slices may be adjacent to each other.

Each slice may be delimited by a supporting rib, in which supporting ribs of different slices exhibit a radial symmetry in relation to a point of contact of the narrow ends of the slices.

There may be provided a compressible sole of a footwear, in which the compressible sole consisting essentially of multiple compressible cells that may be made of a flexible material and consisting essentially of sidewalls that form top openings and bottom openings; in which the compressible sole may be configured to perform, under pressure applied on the compressible sole, a folding movement to exit an uncompressed state and enter a compressed state, while substantially maintaining a thickness of the compressible sole, in which a longitudinal axis of the compressible sole while in the uncompressed state may be oriented to a longitudinal axis of the compressible sole while in the compressed state.

Some of the multiple compressible cells form a compressible spiral.

Some of the multiple compressible cells form a compressible approximation of a spiral.

There may be provided a compressible footwear that may include a compressible sole and compressible upper part that may be mechanically coupled to the compressible sole; in which the compressible sole consisting essentially of compressible cells that may be made of a flexible material and may have top openings and bottom openings that belong to ventilation paths that reach an inner space formed between the compressible sole and the compressible upper part; in which the multiple compressible cells span over at least a majority of the compressible sole and may be configured to undergo a compression while substantially maintaining a thickness of the compressible sole.

There may be provided a compressible sole of a footwear, in which the compressible sole may include multiple compressible cells that are configured to undergo compression under pressure applied on the compressible sole, while substantially maintaining a thickness of the compressible sole.

The compressible sole may be a vented compressible sole that provides multiple ventilation paths to an upper part of the compressed sole.

The compression may be a linear compression.

The compression may be along a longitudinal axis of the compressible sole.

The compression may be a non-linear compression.

In either one of the compressible soles illustrated in the specification the density and/or shape/and/or size and/or thickness and/or material of the compressed cells may be uniform or may be ununiform—for example—different parts of the compressible sole may be include compressed cells of different shape and/or of different size and/or of different density and/or of different thickness, and/or of different material. For example the read side of the compressible sole may be subjected to more pressure than the front of the compressible sole—and thus may include (in relation to the front of the compressible sole) denser compressible cells, and/or compressed cells that have thicker sidewalls, and/or compressible cells from a stronger material, and the like.

Any combination of features illustrated in any part of the specification may be provided.

Any combination of any of the subject matter of any of original claims may be provided. For example—within set of claims that includes an independent claim and multiple dependent claims—each dependent claim may be dependent on any other dependent claims as long as the subject matter of a certain dependent claims does not depend on another dependent claim that has a subject matter that contradict the subject matter of the certain dependent claim.

Figure 1B:
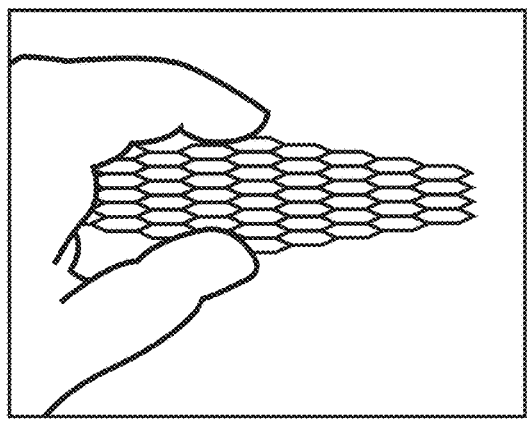
Figure 1C:
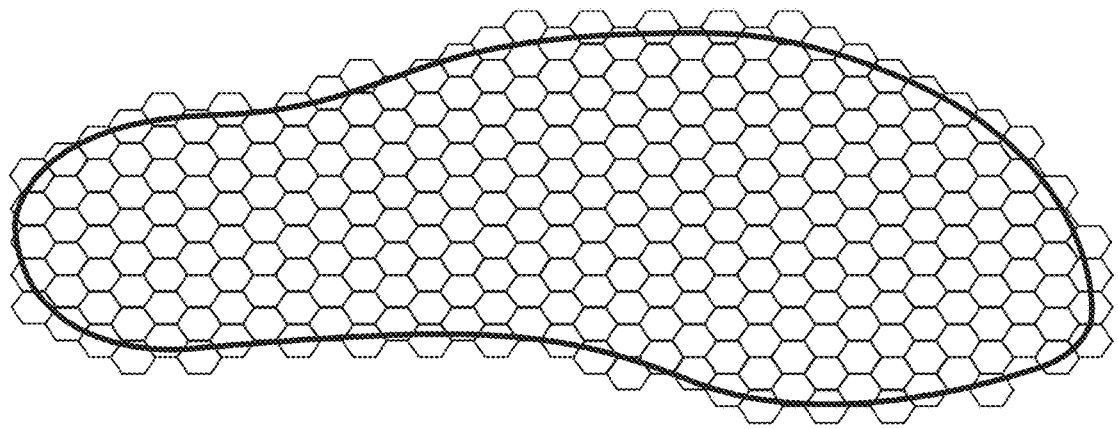
Figure 1D:
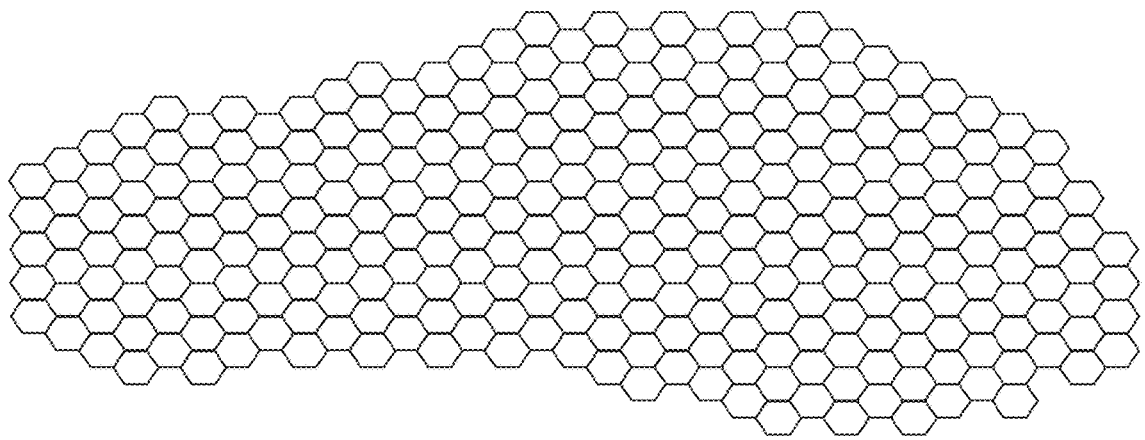
Figure 2:
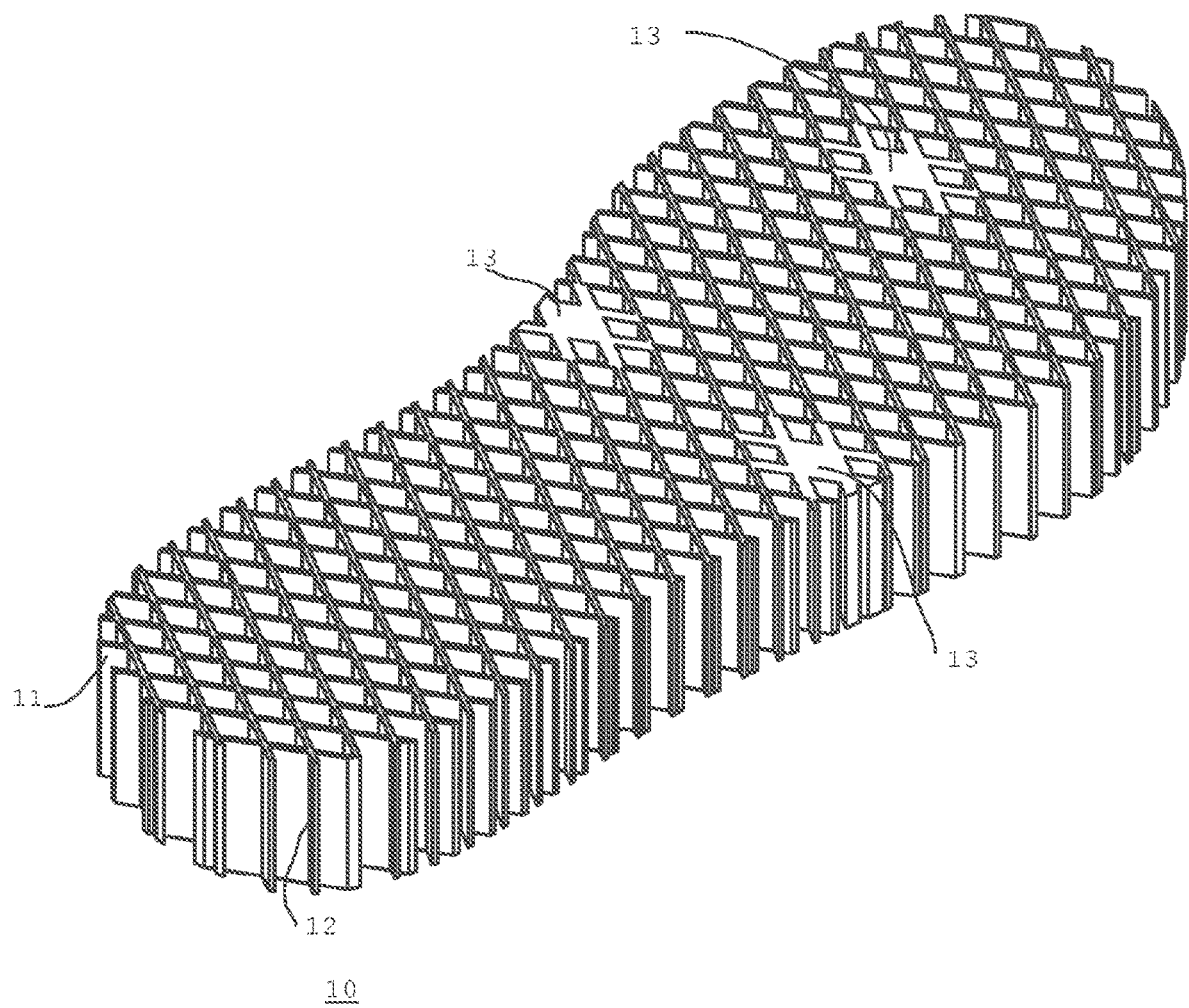
Figure 3A:
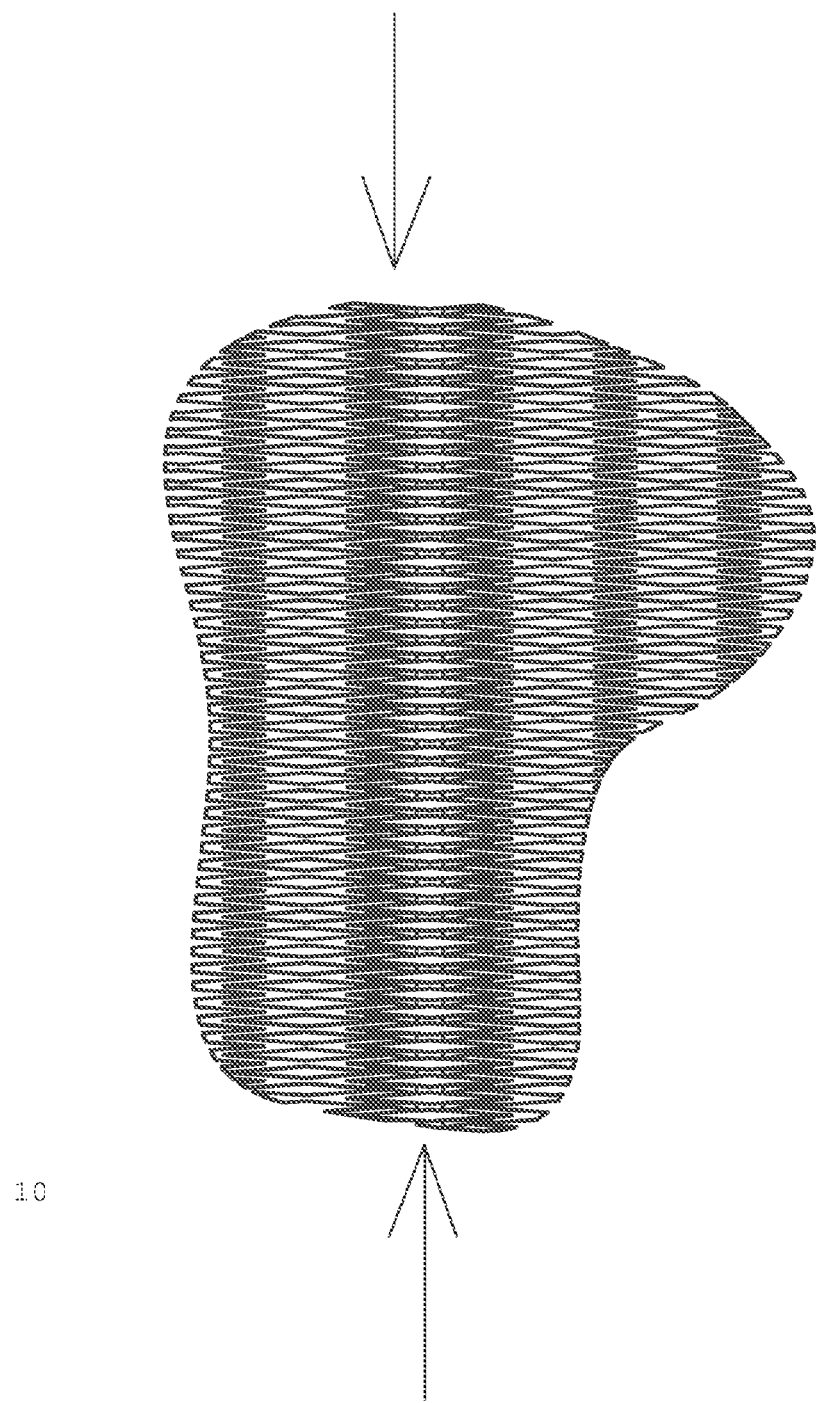
Figure 3B:
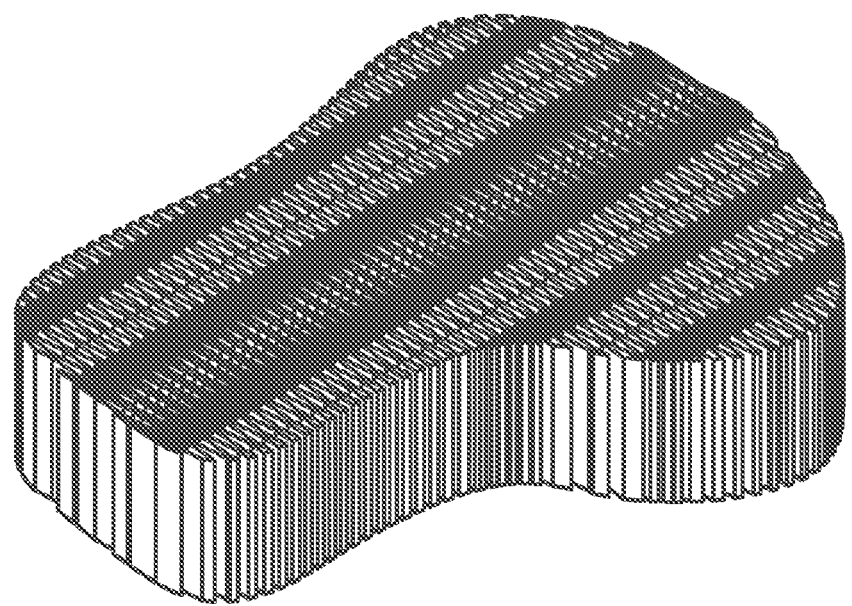
Figure 4:
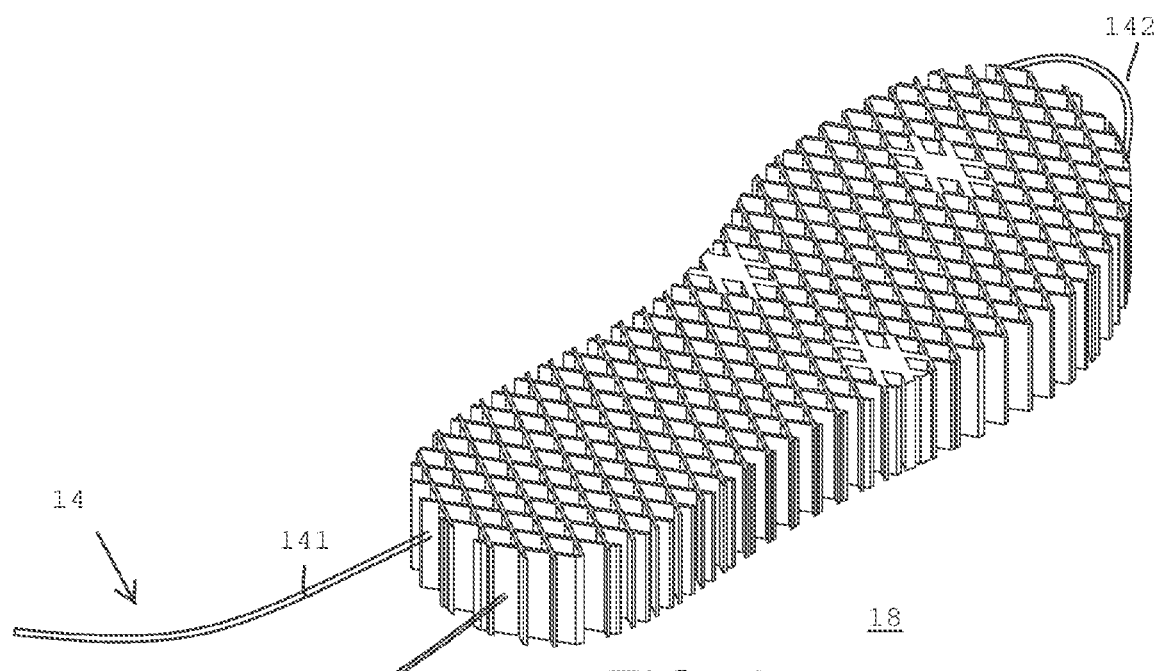
Figure 5:
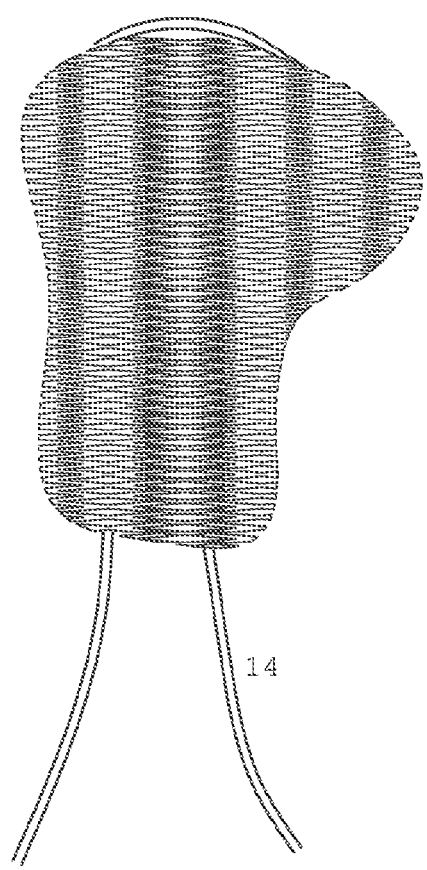
Figure 6:
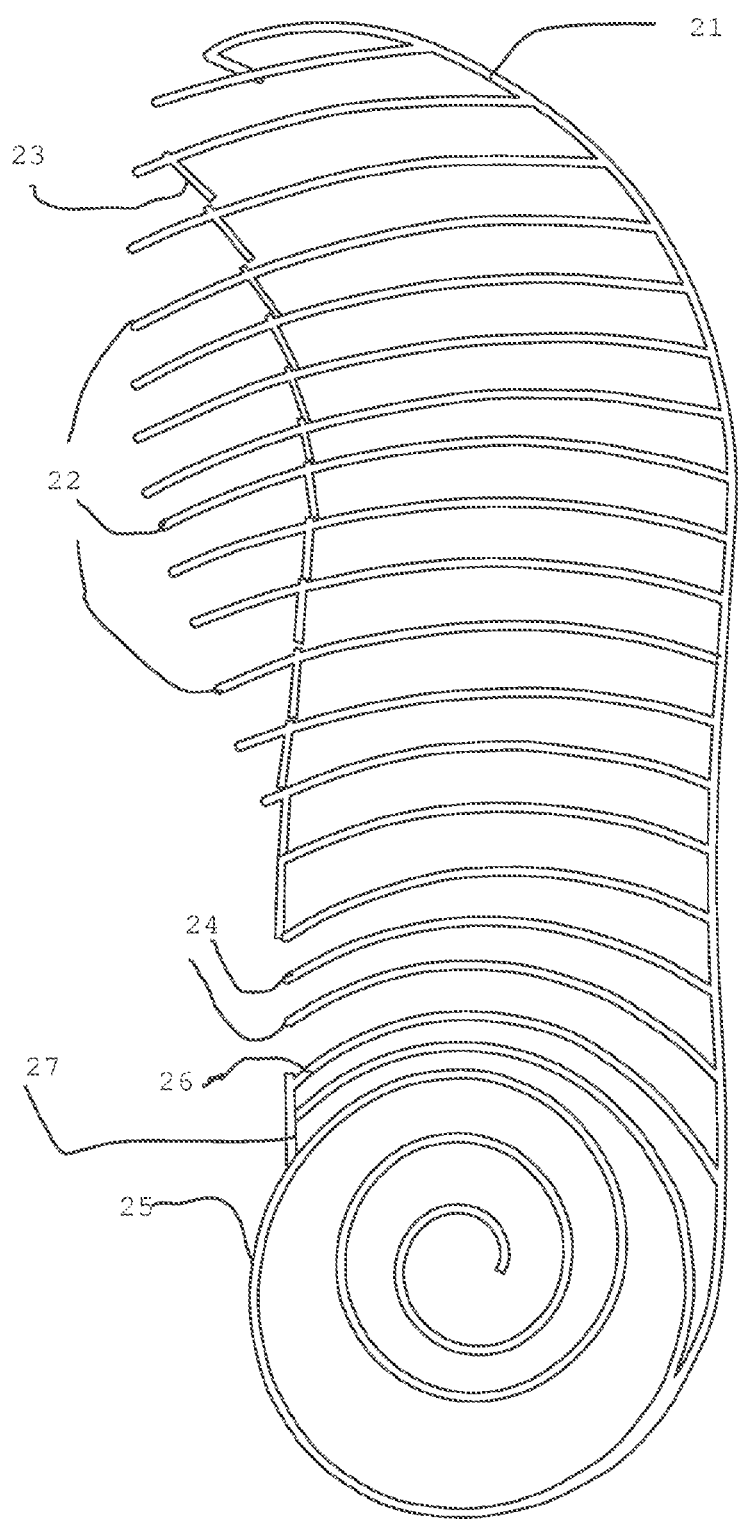
Figure 7:
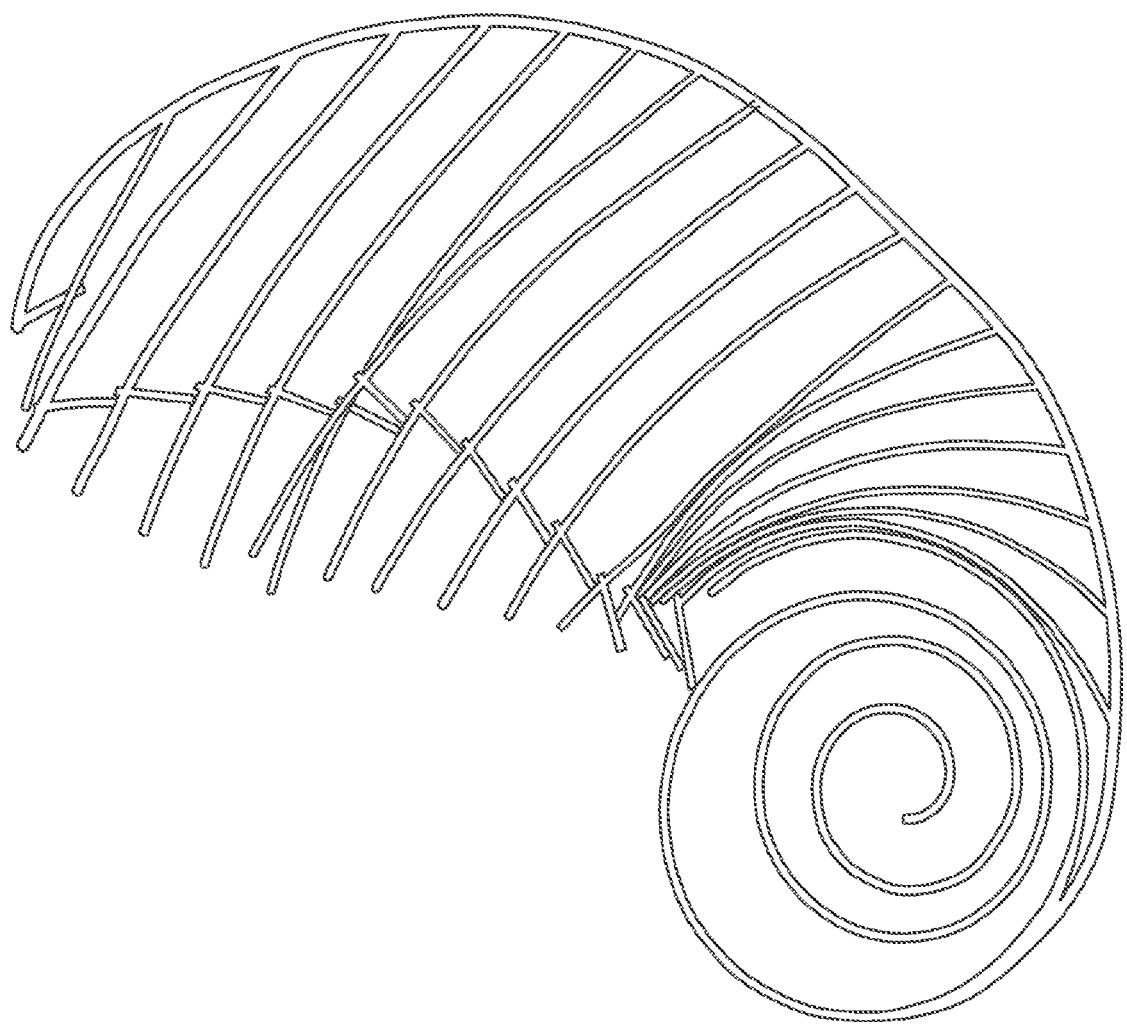
Figure 8:
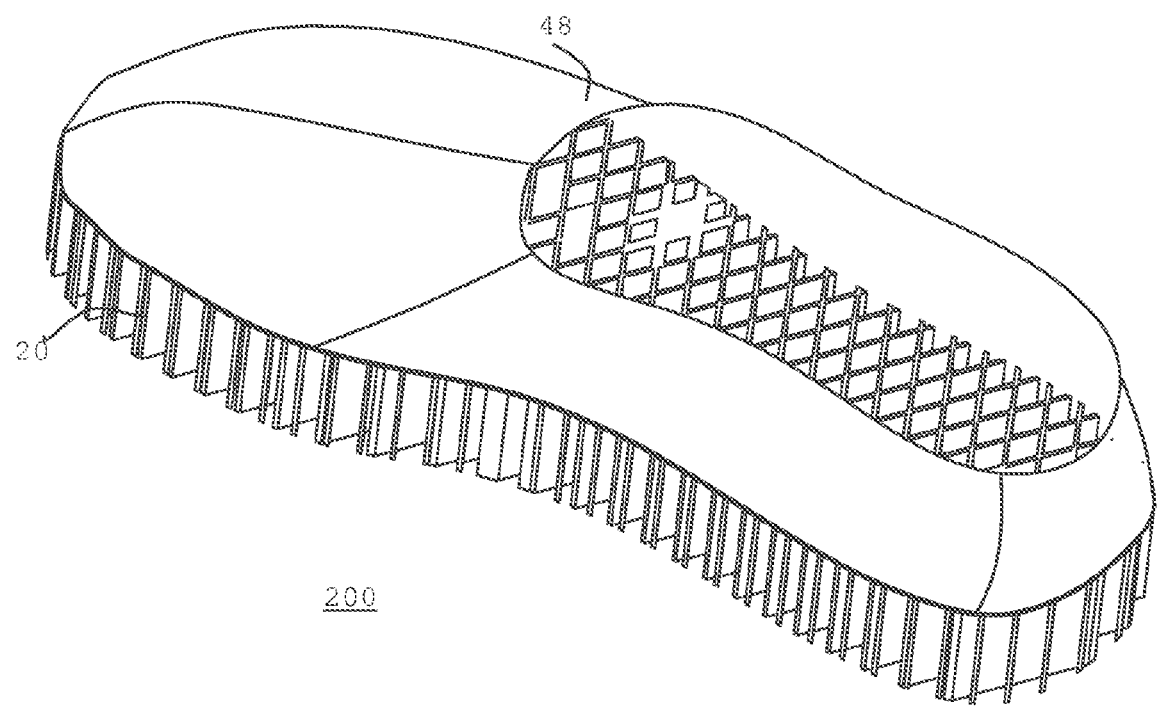
Figure 8:
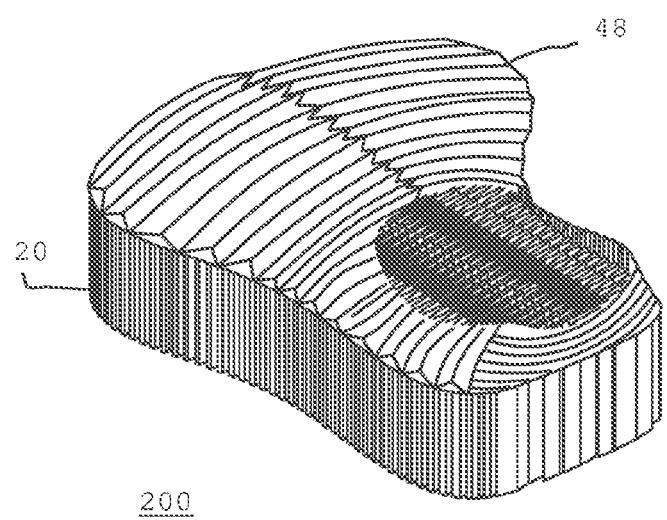
Figure 9:
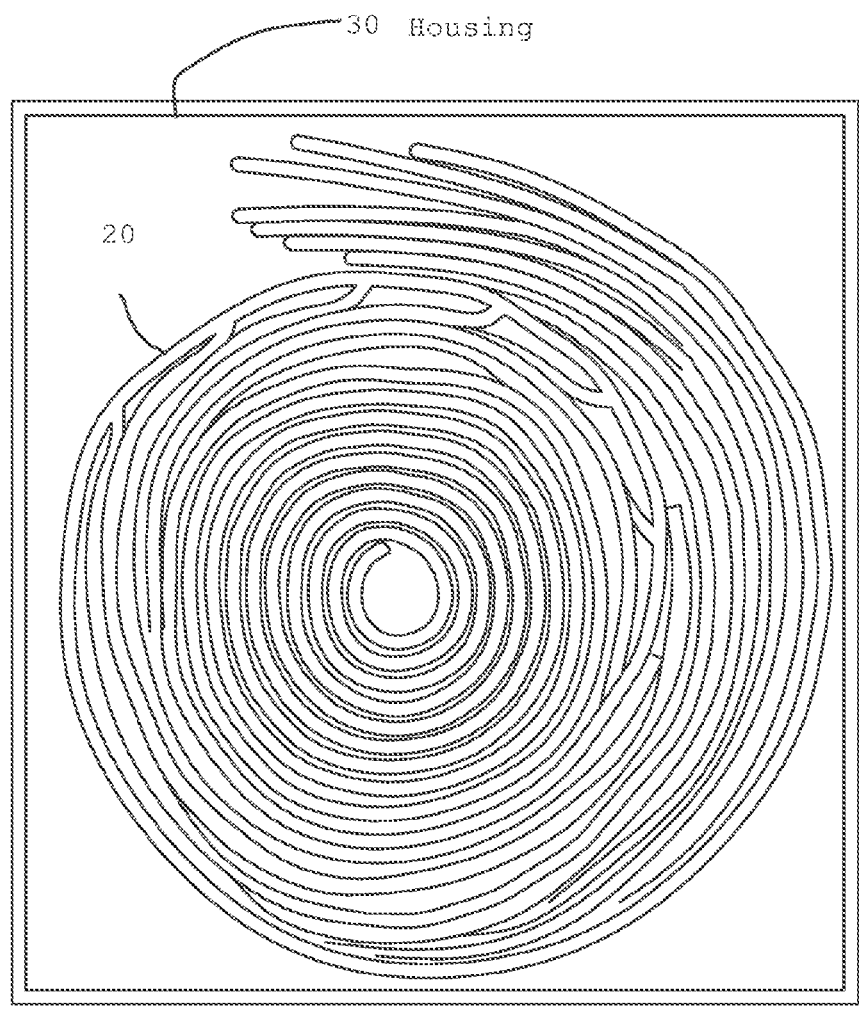
Figure 10:
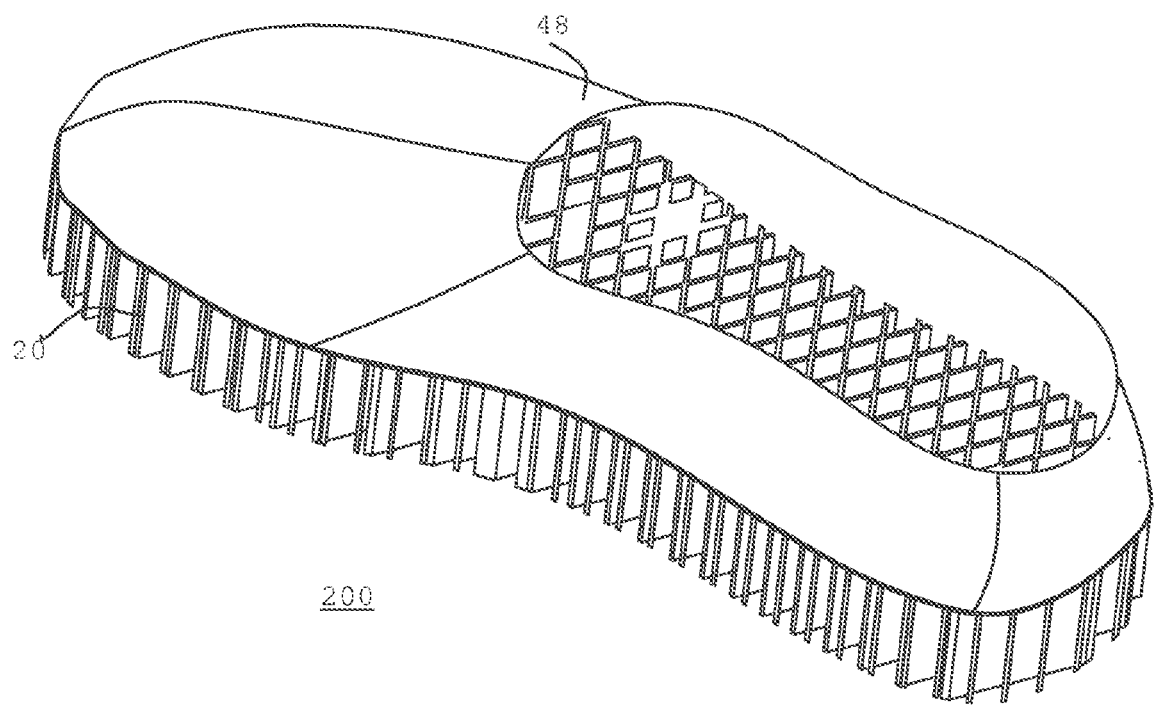
Figure 10:
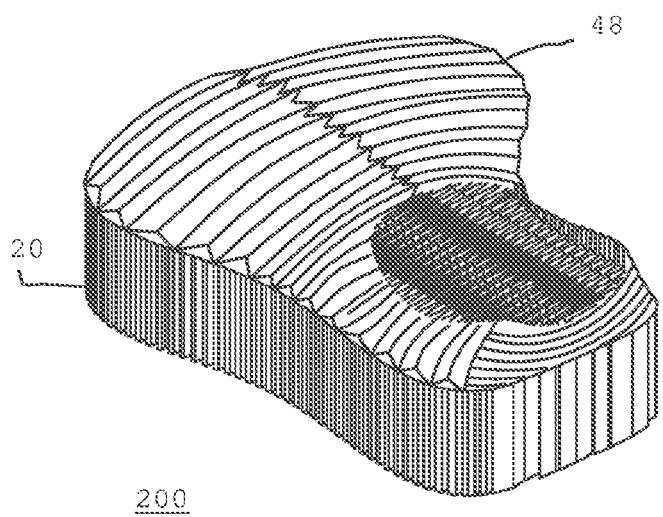
Figure 11:
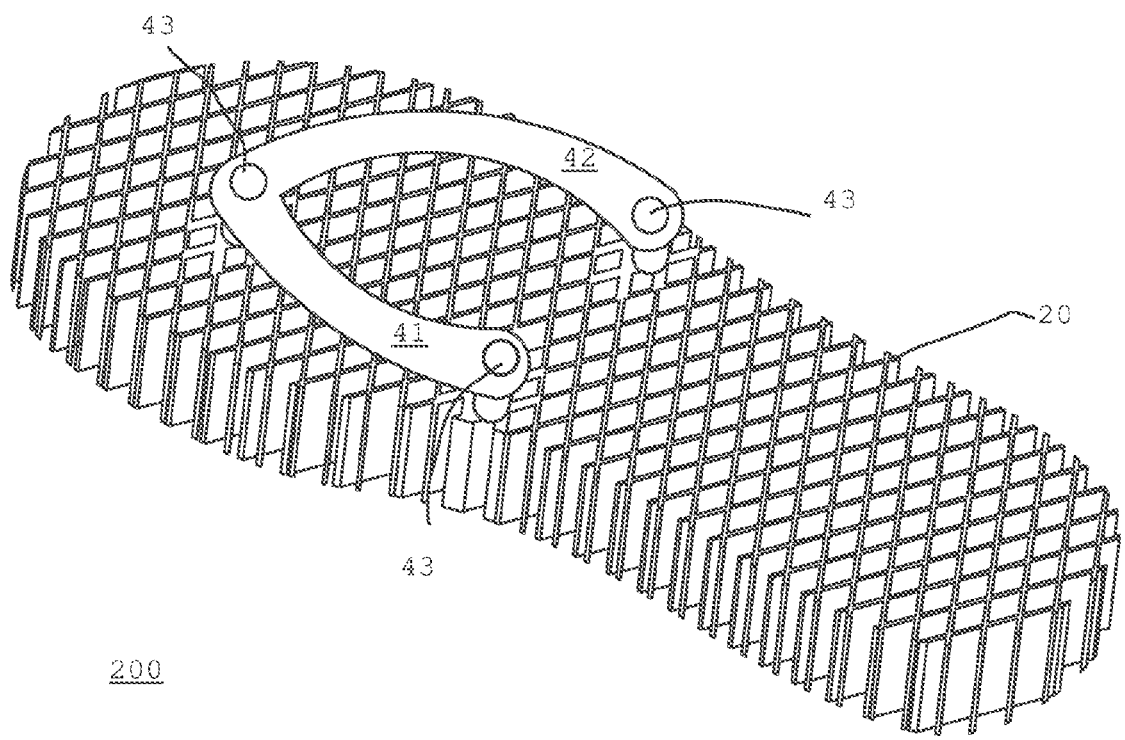
Figure 11:
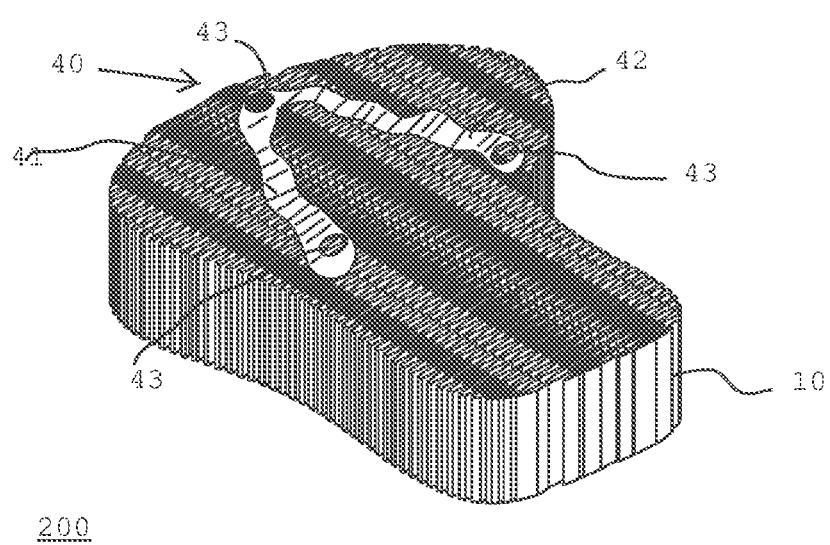
Figure 12:
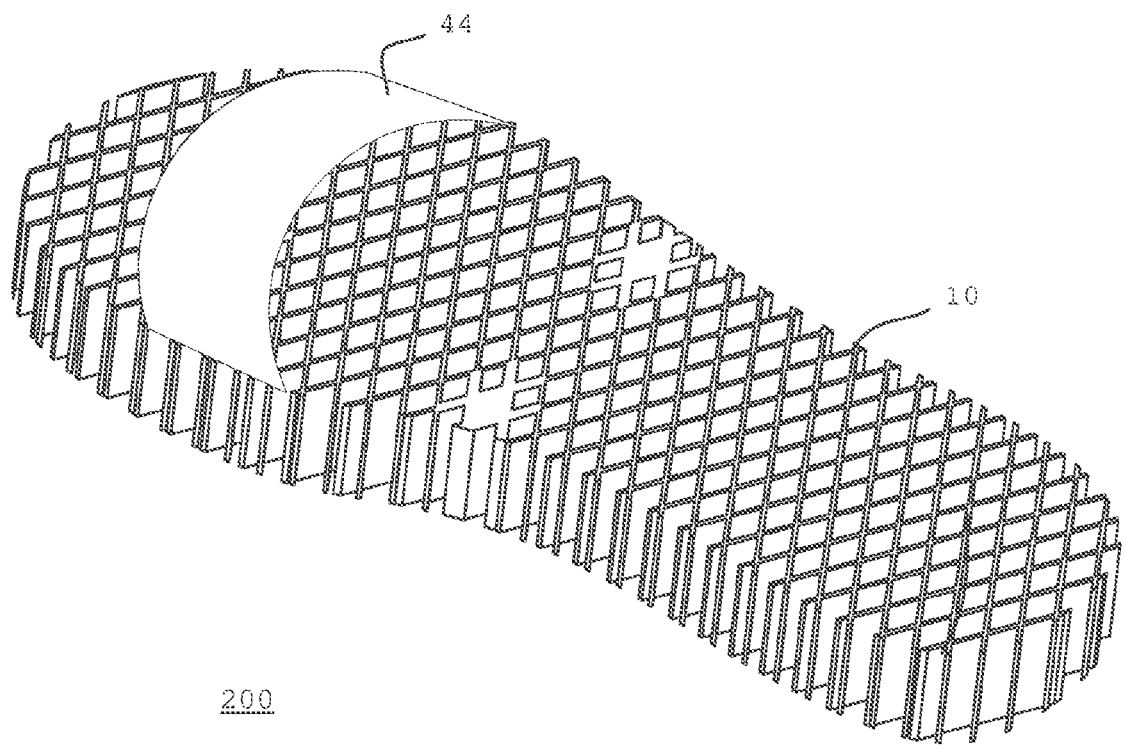
Figure 12:
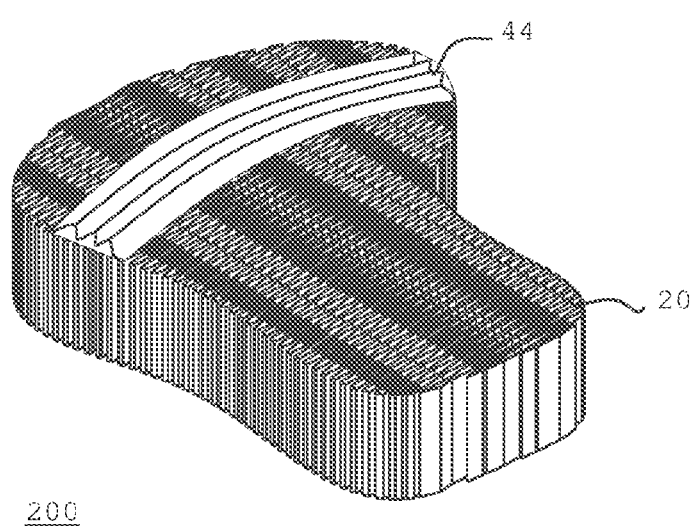
Figure 13:
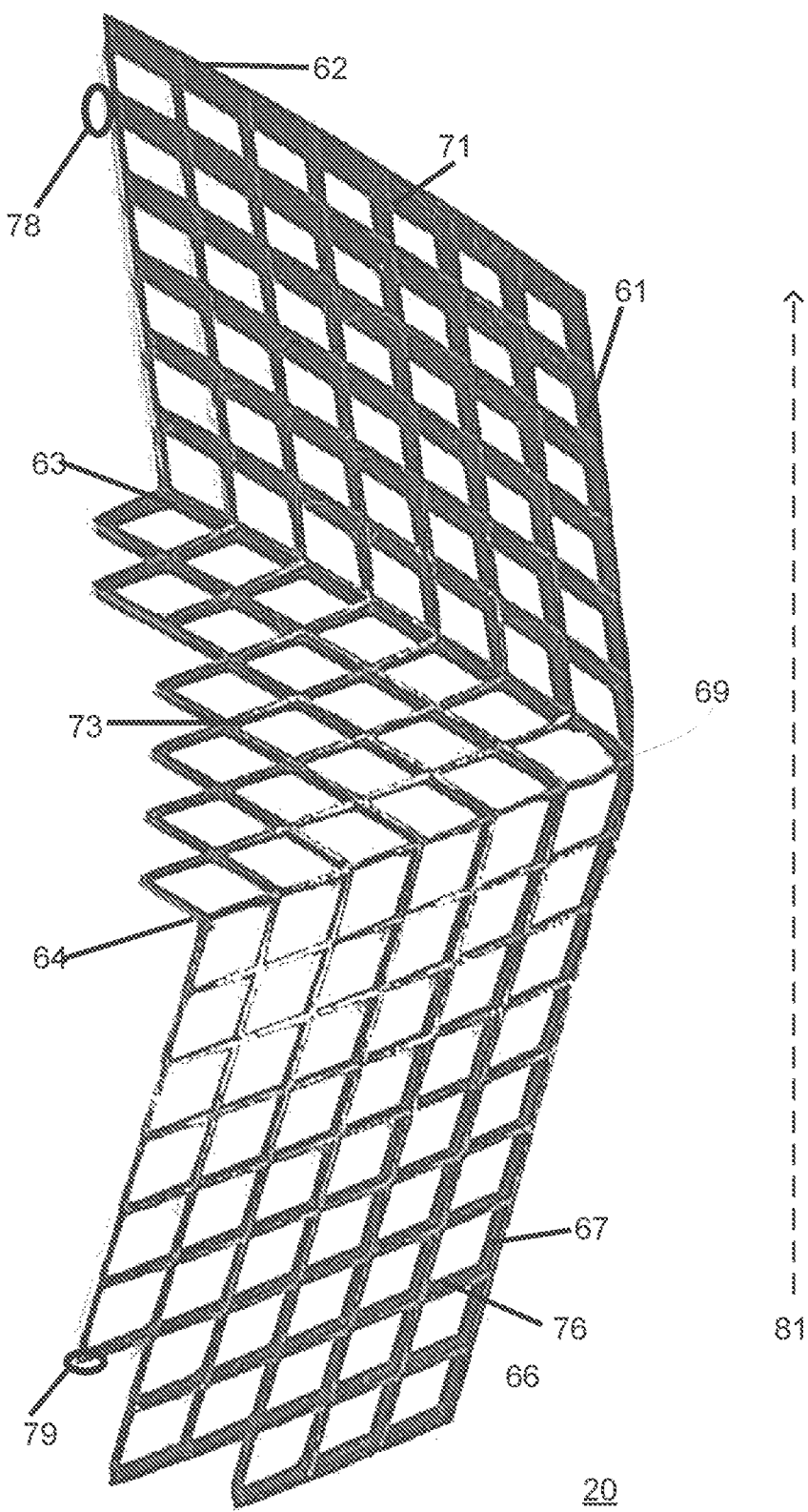
Figure 14:
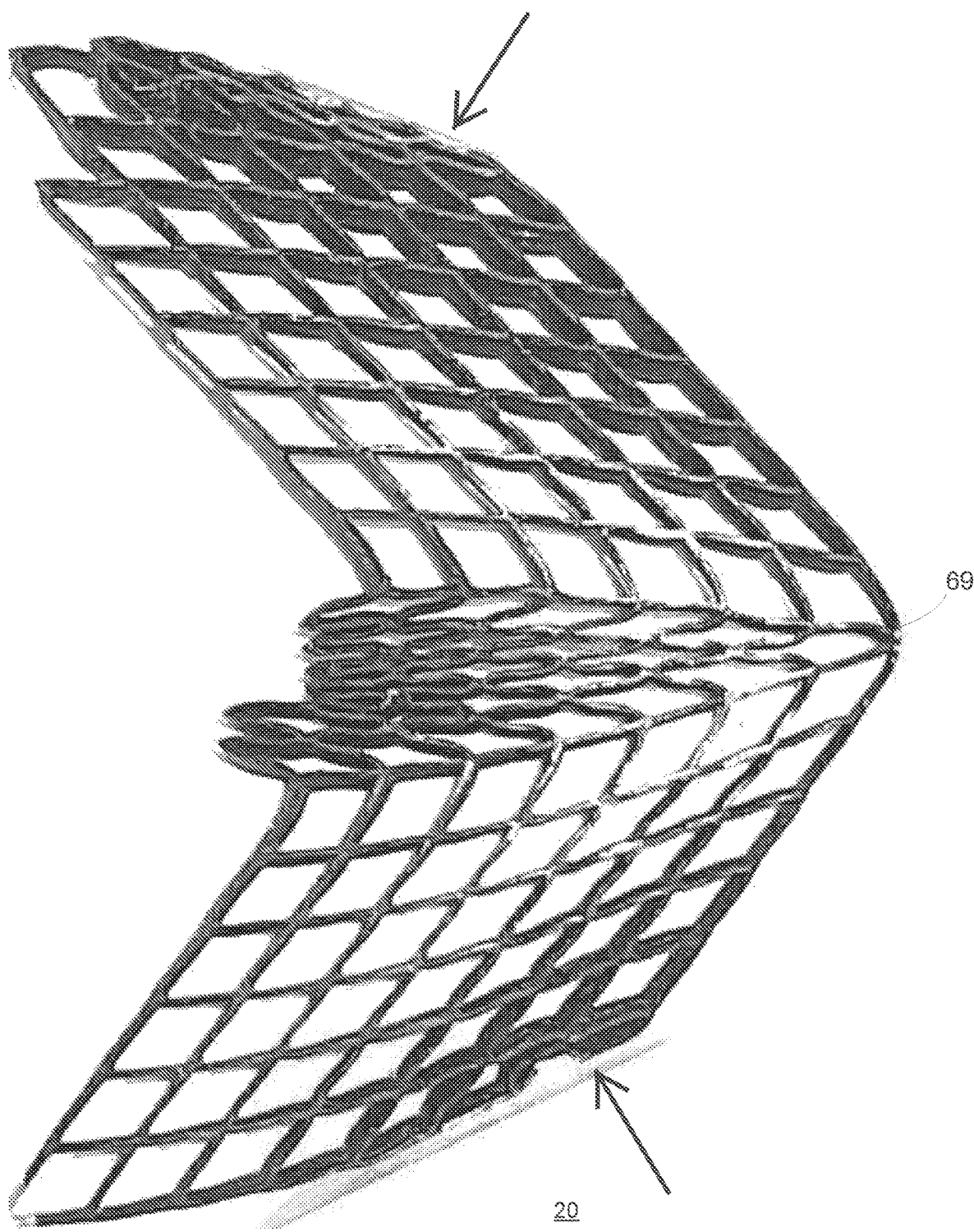
Figure 15:
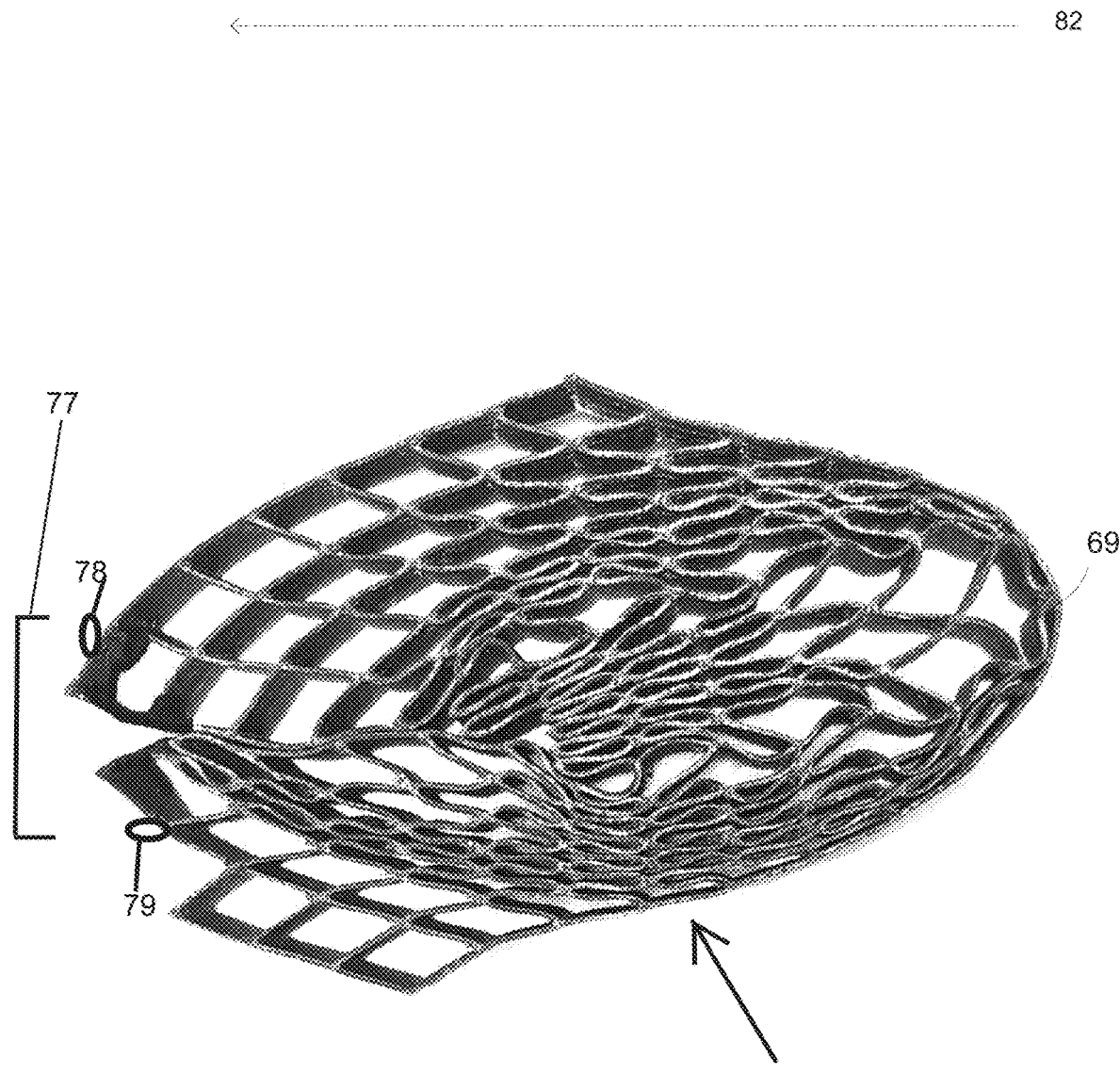

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 1A, which is FIG. 3A from US2017/182723, illustrates a prior art honeycomb in expanded configuration;

FIG. 1B, which is FIG. 3B from US2017/182723, illustrates a prior art honeycomb in squashed configuration;

FIG. 1C, which is FIG. 11A from US2017/182723, illustrates a prior art honeycomb, trimmed into a shoe shape and a computer-generated three-dimensional shoe-shaped honeycomb;

FIG. 1D, which is FIG. 11B from US2017/182723, illustrates a prior art honeycomb, trimmed into a shoe shape and a computer-generated three-dimensional shoe-shaped honeycomb;

FIG. 2 illustrates an example of compressible sole in an uncompressed state;

FIG. 3A illustrates an example of compressible sole in a compressed state;

FIG. 3B illustrates an example of compressible sole in a compressed state;

FIG. 4 illustrates an example of compressible sole in an uncompressed state;

FIG. 5 illustrates an example of compressible sole in a compressed state;

FIG. 6 illustrates an example of compressible sole in an uncompressed state;

FIG. 7 illustrate examples of compressible sole during a compression process;

FIG. 8 illustrate examples of compressible sole during a compression process;

FIG. 9 illustrates an example of compressible sole in a compressed state;

FIG. 10 illustrates an example of a compressible shoe in a compressed state and in an uncompressed state;

FIG. 11 illustrates an example of a compressible shoe in a compressed state and in an uncompressed state;

FIG. 12 illustrates an example of a compressible shoe in a compressed state and in an uncompressed state;

FIG. 13 illustrates an example of compressible sole in an uncompressed state;

FIG. 14 illustrates an example of compressible sole during a compression process; and FIG. 15 illustrate an example of a compressible sole in a compressed state.

DETAILED DESCRIPTION OF THE DRAWINGS

Prior to elaborating any embodiment of the present invention, in order to present the background for the inventive concept more clearly, reference is firstly made to FIGS. 1a to 1D, which are FIGS. 3A-3B and 11A-11B from US2017/182723, showing a prior art honeycomb in expanded and squashed configurations, as well as another prior art honeycomb trimmed into a shoe shape and a computer-generated three-dimensional shoe-shaped honeycomb.

The constructions of US2017/182723 shown in FIGS. 3A-3B depend on eventual bonding of the honeycomb to a face sheet or skin, as in typical sandwich core construction. Until this happens, the honeycomb itself still has an internal mechanism, such as squashing flat, as shown in the example honeycomb of FIGS. 3A and 3B, and therefore is not dimensionally stable.

FIGS. 11A and 11B depict, respectively, a honeycomb of US2017/182723 trimmed into a shoe shape and a computer-generated three-dimensional shoe-shaped honeycomb. To do this, the desired shape is parameterized according to of US2017/182723 by a list of points, and a point-in-polygon ray casting test is performed for the center of each honeycomb cell. Then, taking the left-most cell as a starting point, according to of US2017/182723 the boundary can be efficiently walked with a move look-up table. This identifies the boundary cells of the honeycomb US2017/182723. To make sure the boundary cells effectively close, a set of rules are applied according to of US2017/182723 to the folding diagram about which faces to trim, and whether to apply edge-case joinery.

Calisch et al., in US2017/0182723, disclose, for example, in FIGS. 3A and 3B, a honeycomb which is shaped a sole, where the honeycomb can assume an expanded and squashed configuration. Calisch et al. further discuss flexible properties of the honeycomb, for example beginning at paragraph [0095]. However, Calisch et al. clearly require stabilizing the structural honeycomb by joining one or more abutting, or nearly abutting, honeycomb faces in a manner that holds the structural honeycomb together.

For instance Calisch et al. further explicitly requires in paragraphs [0006]-[0007] of US2017/0182723 that the three-dimensional honeycomb structure having a plurality of cells, with each cell having at least one joinery mechanism attached to or between abutting faces in a manner that stabilizes the structural honeycomb into a fixed shape.

Furthermore, the discussion of using such a sole in US2017/0182723 in combination with an upperpart, for example, in FIGS. 29A and 29B, presents upper parts that would hinder the compression of the sole in both of the two dimensions referenced in the new claims (dimension extending in the plane between the user-contacting surface and the ground contacting surface).

Accordingly Calisch et al. neither teach nor imply a compressible shoe that can assume a compressed state and an uncompressed state. Moreover Calisch et al. neither teach nor imply a compressible sole or footwear configured for assuming a compact size, configured for portability of the compressible footwear.

On the contrary, Calisch et al. teach away from producing a compressible shoe that can assume a compressed state and an uncompressed state, because Calisch et al. explicitly denote the characteristic of compressibility, namely the ability of assuming compressed and uncompressed states, as an undesired side-effect of the intermediate honeycomb product, and expressly teach stabilizing the intermediate honeycomb product, to diminish the compressibility of the honeycomb and obviate the ability of assuming compressed and uncompressed states.

Tvoua et al. in U.S. Pat. No. 8,011,119 discloses some compression at the horizontal plane. However the compression in U.S. Pat. No. 8,011,119 is rather limited and configured merely for size adjustment and not configured for assuming a compact size, configured for portability of the compressible footwear. Accordingly Tvoua et al. neither teach nor imply a compressible sole or footwear configured for assuming a compact size, configured for portability of the compressible footwear.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using mechanical components known to those skilled in the art, details will not be explained in any greater extent than that considered necessary as illustrated above, for the understanding and appreciation of the underlying concepts of the present invention and in order not to obfuscate or distract from the teachings of the present invention.

The drawings may or may not be of scale. The compressible cells of the compressible sole may be of any shape and size.

The drawings provided non-limiting examples of the compressible footwear and/or of a compressible sole. The number of elements (for example slices, ribs, compressible cells), the shape of the elements (for example slices, ribs, compressible cells) may differ from those illustrated in the drawings.

There is provided a compressible sole of a footwear (hereinafter "compressible sole").

The compressible sole may be moved (by a user) between a compressed (or folded or non-expanded) state to an uncompressed (or unfolded or expanded) state.

The compressible sole may be moved between a compressed state to an uncompressed (or state while substantially maintaining the same thickness.

Substantially may mean allowing non-material thickness changes such as but not limited to deviations that do not exceed 5, 10, 15, 20, 25, 30 percent of the thickness.

Substantially may mean allowing non-material thickness changes such as but not limited to deviations that do not exceed 1, 2, 3 or 4 centimeters.

The ratio between the area of the expandable sole in the expanded state and the area of the expandable sole in the non-expanded states may exceed 1. The ratio may exceed 2, 3, 4, 5 and the like.

The substantially maintaining of the thickness of the compressible sole—even when changing the state of the compressed sole—is highly beneficial—especially when the sole is substantially flat—as it allows the compressed sole to be stored in a confined space that is not high—and even allows to stack multiple compressed sole in a highly efficient manner.

Additionally or alternatively, the compressible sole may include a compressible spiral and additional parts and may be compressed by performing a rotation about an axis that is substantially perpendicular to a longitudinal axis of the compressible sole.

The compressed sole can be made of a flexible material. The flexible material can be, for example, plastic, cardboard, rubber, silicon, sponge, and the like. The compressed sole can be made of water resistant material, water proof material and the like.

The compressed sole can be arranged as a mesh, a a grid, or any other arrangement of linear and/or curved segments or other structural elements.

The compressed sole, when in an uncompressed form is highly ventilated. A foot of person that uses a footwear is highly ventilated.

FIG. 2 illustrates an example of compressible sole 10 in an uncompressed state. The heel region is illustrated in the lower-left of the figure, and the toe region is illustrated in the upper-right of the figure.

Compressible sole 10 is made of a mesh of flexible ribs that include positively oriented ribs 11 and negatively oriented ribs 12. Any other arrangement of ribs may be used. For example—there may be ribs that are oriented in more than only two orientations.

Any arrangement of structural elements that can be coupled to each other and enable the compressible sole to move between the compressible and non-compressible states while substantially maintaining the same height may be used.

FIG. 3A illustrates an example of compressible sole 10 in a compressed state. The compression is done along a longitudinal axis of the compressible sole 10.

FIG. 3B illustrates an example of compressible sole 10 in a compressed state.

FIG. 4 illustrates an example of compressible sole 18 in an uncompressed state. FIG. 5 illustrates an example of compressible sole 18 in a compressed state.

Compressible sole 18 includes a string (or lace or cord) 14 that passes through the ribs so that an intermediate part 142 of the string extends from the front end of the mesh while the exteriors of the lase extend from the rear side of the mesh. The mesh can be compressed against the intermediate part 142 of the string and the string can be secured—thereby maintaining the compressed sole 18 in a compressed state.

FIG. 4 also illustrates a top opening 12 of a compressible cell and a lower opening 12 of another compressible cell. The compressible cells form venting paths for venting the foot when positioned on the compressible shoe.

FIG. 6 illustrates an example of compressible sole 20 in an uncompressed state. FIGS. 7-8 illustrate examples of compressible sole 20 during a compression process. FIG. 9 illustrates an example of compressible sole 20 in a compressed state.

Compressible sole 20 is compressed and uncompressed by a rotational movement or a spiral movement.

Compressible sole 20 is made of flexible structural elements that include spiral 25 that may be compressed and other parts of the compressible sole 20 may be folded around the spiral.

In FIGS. 6-9 the other parts include a longitudinal structural elements 23, external structural element 21 and 27, latitudinal structural elements 22, 24 and 26.

The external structural element 21 defines a right edge of the compressible sole 20. It extends from the spiral and to the front end of compressible sole 20.

The majority of the left side of the compressible sole 20 is not delimited by a longitudinal structural element.

The longitudinal structural elements 23 are connected to multiple latitudinal structural elements 23—and a majority of these latitudinal structural elements are proximate to the left end of these latitudinal structural elements 23.

The latitudinal structural elements 24 are not connected to any of the latitudinal structural elements 23 to ease the folding of the compressible sole 20.

External structural element 27 defines a left edge of latitudinal structural elements 26. The latitudinal structural elements 26 are positioned between spiral 25 and latitudinal structural elements 24.

The structural elements may be ribs, may have a polygon cross section or any other cross section.

In any of the compressible soles the structural elements (such as ribs) may have a uniform thickness, may have a variable thickness, and the like, may be of the same height, may differ from each other by height, and the like.

Compressible sole 10 also include interfaces 13 that may be interface an upper part of a footwear.

The compressible sole can interface to an upper part of a footwear by any means—by laces, any detachable interface, and the like. The upper part may be flexible, removable, and the like.

FIGS. 10-12 illustrate examples of compressible shoes 200 in a compressed state (lower part of each figure) and in an uncompressed state (upper part of each figure). The heel regions are illustrated in the lower-right, and the toe regions are illustrated in the upper-left. Each compressible shoe 200 includes a compressible sole 20 and a compressible upper part that is connected to the compressible sole by connecting elements (some of which are not shown) that may be or may include a gluing material, a mechanical attachment element (a fastener such as a hooks and loops fastener, any other locking mechanism, laces, and the like). As the figures show, the compressible cells have bottom openings at their ground contacting surfaces and top openings at their user-contacting surfaces. As the figures also show, the cells extend adjacent one another between the ground-contacting and user-contacting surfaces in two dimensions with some cells under the heel region and some cells under the toe region. The cells are compressible in the dimension extending between the heel and toe regions. The figures further show that the upper part also compresses so as not to hinder the compression of the sole.

Each one of the compressible soles is vented as the opening formed by the compressible sole are substantially open.

In FIG. 10 the compressible upper part 48 has an upper opening through which the foot may enter. The upper part 48 can be made of cloth or any other compressible material. The lower part of the upper part 48 may be fastened to the compressible sole in any manner. The upper opening is spaced apart from the compressible sole. Although FIG. 10 illustrates the compressible upper part 48 without openings, the compressible upper part 48 may have openings. The compressible upper part 48 may include laces or any other means for tightening the grip on the foot once inserted into the shoe.

In FIG. 11 the compressible upper part 48 has two compressible straps 41 and 42 and that are connected to the compressible sole 20 by the connecting elements 43.

In FIG. 12 the compressible upper part 48 has a single compressible strap 44 that is connected to the compressible sole 20 by connecting elements (not shown).

The compressible upper part may have any shape or size and formation.

FIGS. 13-15 illustrate an example of a compressible sole 20.

The compressible shoe is configured to fold, under pressure applied on the compressible sole, by performing a rotational movement. The upper part of the compressible sole rotates along a first rotational direction and the lower part of the compressible sole rotates along a second rotational direction that differ from (and may be opposite to) the first rotational direction.

FIG. 13 illustrates the compressible sole 20 as including compressible cells that are arranged in slices (71, 73 and 76) that are oriented to each other. The slices are delimited by supporting elements such as supporting ribs 61, 62, 63, 64, and 67—that meet (or are proximate to each other) at a rotation point 69 that forms a rotation axis. The number of slices may differ from six, the slices may have different shapes and sizes from those illustrated in FIGS. 13-15. The supporting ribs of different slices exhibit a radial symmetry in relation to rotation point 69.

The compressible sole also include connecting elements such as first loop 78 that is connected to an upper part of the compressible sole, a second loop 79 connected to the lower part of the compressible sole and a connector 77 (illustrated in FIG. 15) that has pins or hooks that enter the inner holes formed by the first and second loops—when the compressible sole is a compressed state.

The compressible sole and/or compressible shoe may be manufactures by any one (or a combination of at least two) manufacturing processes: Casting, Molding, Cutting jet water, cutting, Laser cutting, 3D printing, non-3D printing and/or machines cutting.

In the claims, the phrase "consisting essentially of" limits the scope of a claim to the specified materials or steps "and those that do not materially affect the the basic and novel characteristic(s)" of the claimed invention. For example—a compressible cell consisting essentially of sidewalls is a compressible cell that provides a venting path through the compressible cell and/or is a compressible cell that includes a top opening and a bottom opening that are unblocked.

In the claims, the phrase "consisting of" excludes any element, step, or ingredient not specified in the claim.

The compressible cells may be shaped and/or size to be compressed in a certain manner. This may be achieved by shape and/or orientation of the compressible cells and/or by the connectivity between the compressible cells. For example, the compressible cells may have sidewalls that are substantially normal to the compression direction and/or as being made of flexible material.

In the claims, the term "comprising", which is synonymous with "including," "containing," or "characterized by," is inclusive or open-ended and does not exclude additional, unrecited elements or method steps.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A compressible footwear comprising:
   a compressible sole comprising a plurality of compressible cells made of a pliant material and consisting essentially of sidewalls that form top openings and bottom openings;
   wherein said plurality of said compressible cells span over at least a majority of said compressible sole and are configured to undergo a compression while substantially maintaining a constant thickness of said compressible sole;
   wherein said plurality of said compressible cells of said compressible sole are configured for reversibly assuming:
      a compressed configuration, and
      an uncompressed configuration;
   wherein in said compressed configuration said plurality of said compressible cells of said compressible sole are effectively collapsed along at least one axis selected from the group consisting of: a longitudinal axis across a horizontal plane of said compressible sole and a lateral axis, across said horizontal plane of said compressible sole;
   wherein said compression comprising maintaining essentially constant height of said compressible sole along a vertical plane is essentially maintained;
   wherein said compression comprising maintaining an essentially planar shape of said compressible sole along a vertical axis perpendicular to across said horizontal plane of said compressible sole is essentially maintained;
   wherein said plurality of said compressible cells are not stabilized and wherein compressibility of said plurality of said compressible cells is maintained, thereby preserving ability of said plurality of said compressible cells reversibly assuming said compressed and uncompressed configurations, and
   a plurality of interfaces on a top surface of said compressible sole, configured for engagement of said compressible sole with a compressible upper part of said footwear;
   at least one connecting element configured for mechanically coupling said compressible sole to said compressible upper part;
   said compressible upper part that is mechanically couplable to said at least one connecting element of said compressible sole;
   wherein said compressible upper part is foldable, configured to sustain said reversibly assuming said compressed configuration and uncompressed configuration by said plurality of said compressible cells while collapsing across said horizontal plane of said compressible sole and substantially maintaining said thickness of said compressible sole end-maintaining along a vertical plane and maintaining a planar shape of said compressible sole along;
   wherein said compressible sole in said compressed configuration assumes a compact size, configured for portability of said compressible footwear;
   wherein said uncompressed configuration is a default configuration of said compressible sole and wherein said compressible is spontaneously driven to assume said default configuration, due to intrinsic bias of said plurality of cells;
   wherein said compressible sole in said compressed configuration assuming a size substantially smaller than a size of said compressible sole in said uncompressed configuration;
   wherein said size of said compressible sole in said compressed configuration is smaller by at least seventy percent (70%) than said size of said compressible sole in said uncompressed configuration.

2. The compressible footwear according to claim 1 wherein said plurality of said compressible cells comprise sidewalls that are substantially vertical to the longitudinal axis of said compressible sole.

3. The compressible footwear according to claim 1 wherein said plurality of said compressible cells comprise sidewalls forming a grid.

4. The compressible footwear according to claim 1 wherein said plurality of said compressible cells are arranged in slices, wherein each slice has a first end and a second end that is wider than said first end, wherein said first ends of said slices are adjacent to each other.

5. The compressible footwear according to claim 1 wherein said plurality of said compressible cells are arranged in slices wherein each slice exhibits a radial symmetry in relation to a point of contact of said narrow ends of said slices.

6. The compressible footwear according to claim 1 further comprises at least one structural element, configured for holding said compressible sole of said compressible footwear in said uncompressed configuration.

7. The compressible footwear according to claim 1 further comprises at least one holding element, configured for holding said compressible sole of said compressible footwear in said compressed configuration.

8. The compressible footwear according to claim 1 wherein a resin is selected to spontaneously drive said compressible sole of said compressible footwear into said uncompressed configuration, by intrinsic bias of said pliant material.

9. A compressible sole for a compressible footwear comprises:
   a plurality of compressible cells made of a pliant material and consisting essentially of sidewalls that form top openings and bottom openings;
   a plurality of interfaces on a top surface of said compressible sole, configured for engagement of said compressible sole with a compressible upper part of said footwear;
   at least one connecting element configured for mechanically coupling said compressible sole to said compressible upper part, wherein said compressible upper part is foldable and configured to reversibly assume a compressed configuration and uncompressed configuration;
   wherein said plurality of said compressible cells span over at least a majority of said compressible sole and are configured to undergo a compression while substantially maintaining a constant thickness of said compressible sole;
   wherein said plurality of said compressible cells of said compressible sole are configured for reversibly assuming:
      a compressed configuration, and
      an uncompressed configuration;
   wherein in said compression comprising effectively collapsing compressed configuration said plurality of said compressible cells of said compressible sole are collapsed along at least one axis selected from the group consisting of: a longitudinal axis across a horizontal plane of said compressible sole and a lateral axis, across said horizontal plane of said compressible sole;

wherein said compression comprising maintaining essentially a constant height of said compressible sole along a vertical plane is essentially maintained;

wherein said compression comprising maintaining an essentially planar shape of said compressible sole along a vertical axis perpendicular to across said horizontal plane of said compressible sole is essentially maintained;

wherein said plurality of said compressible cells are not stabilized and compressibility of said plurality of said compressible cells is maintained, thereby preserving ability of said plurality of said compressible cells reversibly assuming said compressed configuration and said uncompressed configuration;

wherein said compressible sole in said compressed configuration assuming a size substantially smaller than a size of said compressible sole in said uncompressed configuration;

wherein said size of said compressible sole in said compressed configuration is smaller by at least seventy percent (70%) than said size of said compressible sole in said uncompressed configuration.

10. The compressible sole for a compressible footwear according to claim 9 wherein a resin is selected to spontaneously drive said compressible sole of said compressible footwear into said uncompressed configuration, by intrinsic bias of said pliant material.

11. The compressible sole according to claim 9 wherein said plurality of said compressible cells comprise sidewalls forming a grid.

* * * * *